United States Patent [19]

Barthel et al.

[11] Patent Number: 4,995,240
[45] Date of Patent: Feb. 26, 1991

[54] CONTROLLING REFRIGERATION HAVING CONTROL MODULE DIRECTLY ATTACHED ON VALVE BODY

[75] Inventors: Richard C. Barthel, Harwood Heights; Peter J. Malone, Rosemont, both of Ill.; Charles D. Orth, Cedarburg, Wis.; George W. Jarosch, Elkgrove, Ill.

[73] Assignee: Eaton Corporation, Cleveland, Ohio

[21] Appl. No.: 362,138

[22] Filed: Jun. 6, 1989

Related U.S. Application Data

[60] Division of Ser. No. 210,159, May 2, 1988, Pat. No. 4,848,100, which is a continuation of Ser. No. 7,147, Jan. 27, 1987, abandoned.

[51] Int. Cl.$^5$ .............................................. F25B 49/00
[52] U.S. Cl. ................................... 62/225; 62/212; 29/890.12
[58] Field of Search ...................... 29/509, 407, 890.12; 62/180, 181, 182, 183, 184, 222, 223, 224, 225, 202, 203, 204, 210, 211, 212, 617; 236/75, 92 B; 251/124, 129.11, 129.05, 129.01; 165/22

[56] References Cited

U.S. PATENT DOCUMENTS

| | | | |
|---|---|---|---|
| 3,698,204 | 10/1972 | Schlotterbeck et al. | 62/212 X |
| 3,872,685 | 3/1975 | Matthis | 62/617 |
| 3,949,807 | 4/1976 | Tyler | 165/22 X |
| 4,459,819 | 7/1984 | Hargraves | 62/225 X |
| 4,499,739 | 2/1985 | Matsuoka et al. | 62/225 X |
| 4,523,435 | 6/1985 | Lord | 62/225 X |
| 4,548,047 | 10/1985 | Hayashi et al. | 236/75 |
| 4,593,881 | 6/1986 | Yoshino | 62/210 X |

Primary Examiner—Joseph M. Gorski
Assistant Examiner—Peter Dungba Vo
Attorney, Agent, or Firm—R. A. Johnston

[57] ABSTRACT

A system for controlling refrigerant flow in an air conditioning system employing an electrically operated valve for controlling flow of refrigerant from the condenser to the evaporator. Separate thermistors sense the temperature of the refrigerant entering and discharging from the evaporator. A comparison of the sensed temperatures is used to modify the control signal to the valve for maintaining proper refrigerant flow to the evaporator. A control module is directly attached on the valve body to enhance heat conduction.

4 Claims, 5 Drawing Sheets

CONTROLLING REFRIGERATION HAVING CONTROL MODULE DIRECTLY ATTACHED ON VALVE BODY

This application is a division of application Ser. No. 210,159 filed May 2, 1988, now U.S. Pat. No. 4,848,100, which is a continuation of Ser. No. 007,147 filed Jan. 27, 1987, now abandoned.

BACKGROUND OF THE INVENTION

The present invention relates to systems for air cooling a compartment or air conditioning systems as they are commonly known, and in particular, relates to systems for air conditioning the cab or occupant compartment of a vehicle. Systems of this type generally employ a compressor/pump for compressing a refrigerant gas which is condensed in a heat exchanger and circulated to a second heat exchanger located in the occupant compartment for evaporation therein, and cooling of the surrounding air in the occupant compartment. Circulation of the condensed refrigerant to the second heat exchanger or evaporator as it is commonly called is controlled by an expansion control valve provided in the flow system between the condensing heat exchanger and the evaporator.

Heretofore, expansion control valves have controlled the flow of refrigerant by providing a means responsive to the evaporator superheat to control movement of a movable valve member. Known expansion control valves typically employ a diaphragm exposed to refrigerant pressure leaving the valve. A bulb senses the temperature at the evaporator outlet and in response thereto pressurizes a fluid filled chamber acting on the opposite side of the diaphragm. Movement of the diaphragm in response to the pressure differential thereacross is employed to move a refrigerant flow control valve member. Such pressure responsive refrigerant expansion control valves thus function to control the flow of liquid refrigerant to the evaporator in response to demand, or rate of vaporization in the evaporator.

Pressure responsive refrigerant flow control valves have found wide spread usage in automotive air conditioning systems because of their simplicity and reliability. However, such pressure responsive valves are limited in their control capability by virtue of their responsiveness to only the refrigerant superheat at the evaporator outlet. Thus, the known systems for controlling refrigerant flow in air conditioning systems, require a pressure sensing means in the evaporator fluid flow circuit capable of sensing the differential pressure.

Recent trends in automotive design have dictated the need for electrical control of not only engine operation, but also auxiliary systems on the vehicle which derive their power from the engine. Thus it has been desired to provide an all electrically controlled air conditioning system for the vehicle, and particularly, a system which could integrate the control of the electric compressor clutching mechanism and the refrigerant flow control in a common microcomputer employed for engine operating control. It has thus been desired to find a way or means of electrically controlling the flow of refrigerant in the automotive air conditioning system in order that the flow of refrigerant may be determined by parameters other than superheat of the evaporator. For example, where the rate of change of temperature in the vehicle occupant compartment is high or rapid, it may be desirable to attenuate the flow of refrigerant in anticipation of overcooling once the desired compartment temperature has been reached.

A known system for providing electronic control of refrigerant flow in a refrigeration system is that shown and described in U.S. Pat. No. 4,571,951, which teaches an electrically controlled refrigerant flow control valve, which is controlled in response to the measurement of pressure in the refrigerant flow circuit at a point near the evaporator discharge port. The flow pressure is then mathematically converted to a saturation temperature and is compared with a measured flow temperature at the evaporator outlet port and the temperatures are compared for providing an electrical control signal to the flow control valve operator.

SUMMARY OF THE INVENTION

The present invention provides a unique control system and method for controlling the flow of refrigerant in an air conditioning system between the refrigerant condensing heat exchanger and the refrigerant evaporating heat exchanger employed for cooling the air in a compartment. The present invention utilizes an electrically operated flow control valve which is responsive to a variable control signal generated by an electronic means such as a microcomputer receiving sensory inputs from the direct measurement of the refrigerant flow temperature as it enters and as it discharges from the evaporating heat exchanger. The sensory inputs comprise thermistors received through the wall of the flow conduit for direct exposure to the refrigerant flow. In a more limited aspect, the present invention provides a unique and novel method of providing passage of the electrical leads for the thermistor through the wall of the refrigerant flow conduit in a pressure sealing and electrically insulating manner which is simple, reliable and easy to fabricate.

The present invention thus provides a system and method for controlling refrigerant flow in an air conditioner which eliminates the need for sensing the pressure of the refrigerant at any point in the system. The present invention thus enables complete electrical control of the refrigerant flow in an air conditioning system based only on measurements of the temperature of the refrigerant flow which permits the use of simple and reliable electrical thermistor devices for temperature sensing.

DETAILED DESCRIPTION

Figure 1:
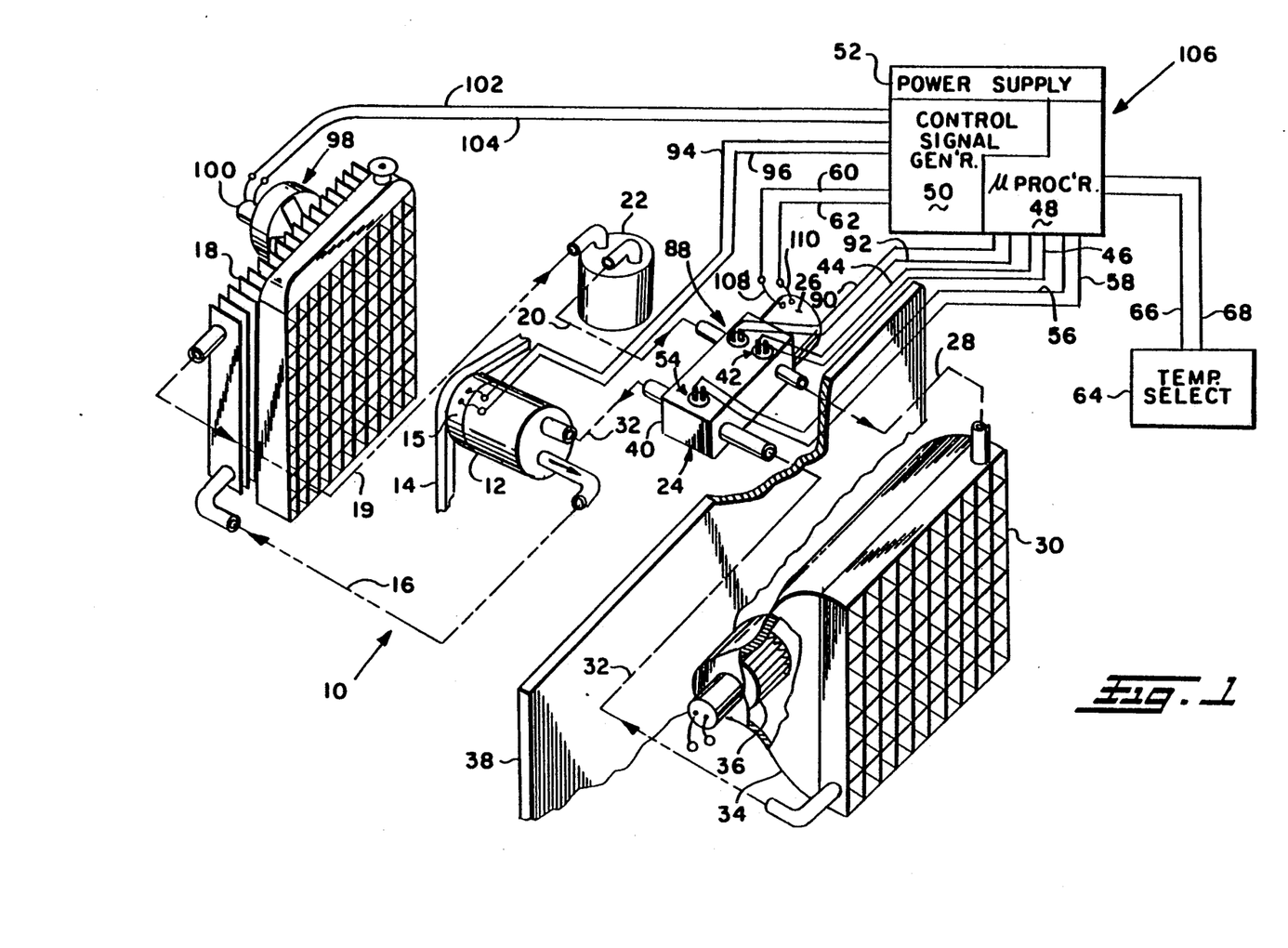
FIG. 1 is a pictorial of the refrigerant flow and schematic for the control system of the present invention; and, FIG. 2 is an enlarged portion of a section view taken through the wall of valve block illustrating the manner of providing electrical leads through the wall of the refrigerant flow passage.

Referring to FIG. 1, the refrigerant flow control system of the present invention is indicated generally at 10 as having a compressor/pump 12 which may be powered at any convenient manner as for example, an engine driven belt 14, and energized by a suitable electrical clutch mechanism 15. The compressor discharges fluid through a conduit 16 connected to the inlet of a suitable exothermic heat exchanger or condenser 18, which has the outlet thereof connected via conduit 19 through a suitable receiver/dryer 22 and conduit 20 to the high pressure inlet port of an electrically operated valve indicated generally at 24. The valve is electrically operated preferably by a solenoid 26, with the outlet of the valve connected via conduit 28 to the inlet port of an endothermic heat exchanger or evaporator 30. The outlet of heat exchanger 30 is connected through conduit 32 via a passage through the valve 24 to the return or suction port of the compressor 12.

The endothermic heat exchanger, or evaporator 30, has attached thereto a plenum 34 which has therein a suitable blower 36 for forcing air across the evaporator 30 for discharge into the passenger compartment.

The valve 24 has a valve block 40 which contains therein a valve seat and a movable valve member (not shown) for controlling flow through conduit 20 to conduit 28. Valve 24 has a temperature sensor preferably in the form of a thermistor disposed through the block 40, as indicated generally by reference number 42, for sensing directly the temperature of the refrigerant flowing on the downstream or expansion side of the valve to conduit 28. Thermistor 42 is connected schematically via leads 44, 46 to a microcomputer or microprocessor, 48 which is associated with a control signal generator 50; and, both are electrically energized by a suitable power supply 52 which may comprise the onboard vehicle power supply.

The valve block 40 also has a temperature sensor in the form of a thermistor, indicated generally at 54, received therethrough which penetrates through conduit 32 for directly sensing the temperature of the refrigerant flowing therein, thermistor 54 is shown schematically connected via leads 56, 58 to the microprocessor 48.

Preferably, a third thermistor, indicated generally at 88, is employed as will hereinafter be described in greater detail.

The valve operator or solenoid 26 is powered by a control signal from the generator 50 supplied schematically along leads 60, 62. The microcomputer 48 also receives "Temperature Select" input commands from the control 64 which may comprise an in-dash mounted touch-activated control or alternatively a dial or lever; and, the control 64 provides input as shown schematically along leads 60, 68.

Figure 2:
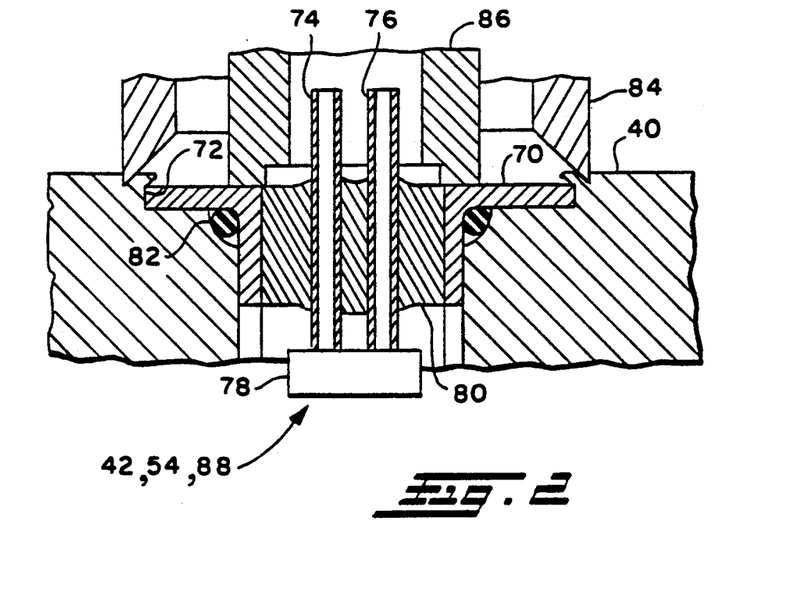

Referring to FIG. 2, the details of the preferred manner of mounting and installing the thermistors 42, 54 and 88 are illustrated in enlarged section. As shown in FIG. 2, the typical thermistor includes an annular flange 70 seated in a flat bottom counter bore or recess 72 provided in the wall of the valve block 40. A pair of spaced electrical terminals 74, 76 are disposed centrally within the annular flange 70 and extend axially outwardly therefrom and are supported and sealed therein by suitable fused glass insulation indicated by reference numeral 80 in a manner well known in the art. Each of the thermistors 42, 54 and 88 has a suitable temperature sensing resistor, indicated by reference numeral 78, attached to the leads 74, 76 and disposed interiorly of the block in the flow path of the refrigerant.

The annular flange is sealed by a suitable elastomeric seal ring 82 provided between the flange and the block; and, the flange is retained in the bore 72 by deforming the material of the block about the bore 72 over the edge of the flange with a suitable tool indicated by reference numeral 84 in FIG. 2. The annular flange having the terminals sealed therein is held in position during the deformation or staking operations by a suitable annular tool 86 which is urged axially downward as shown in FIG. 2 to compress the seal ring 82 and hold the flange 70 against the shoulder or flat bottom of counter bore 72 while the block material is deformed over the edge of the flange. The thermistor mounting technique shown in FIG. 2 thus eliminates the need for providing threads or separate fastening devices to retain and seal the thermistor in the block.

In the present practice of the invention the thermistors 42, 54, 88 employ a sensing element, typically denoted by reference numeral 78 in FIG. 2, in the form of a resistance having a negative temperature coefficient. One commercially available negative coefficient device which has been found to be satisfactory is obtainable from Fenwall Electronics Division of Kidde Corp. 63 Fountain Street, Framingham, Mass. 01701 and bearing manufacturer's type designation UUR43J24. It will be understood however, that other types of such devices may be used.

In operation, upon start-up the control valve is given an initial duty cycle by the microprocessor comprising a pulse of approximately 20 seconds which is about 70% of full pulse width to provide initial cooldown of the evaporator. In the present practice, it has been found satisfactory to provide an initial duty cycle of three (3) minutes where the temperature of the refrigerant at the evaporator inlet, as sensed by thermistor 42, is higher than 28° C. Thereafter, the temperature readings of thermistor 42, 54 and 88 are sampled at the rate of approximately one sample reading each 0.5–0.75 second or every ½ to ¾ of a second. Preferably, a minimum run time for the compressor 12 has been set in the range of 5–10 seconds.

The change in pulse width or amplitude, where an amplitude modulated signal is employed, is thereafter modified in accordance with changes in the difference in the temperature readings of thermistors 42, 54 and may also be further modified by the rate of change of the temperature difference. The strategy for modifying the control signal is indicated in Table I, where Delta T is defined to be positive when the temperature sensed by thermistor 54 is higher than the temperature sensed by thermistor 42; and, Delta T is defined negative when the temperature sensed by thermistor 54 is lower than the temperature sensed by thermistor 42. The rate of change Delta Delta T is termed as positive when the temperature difference between the readings of thermistors 42, 54 is decreasing; and, Delta Delta T is termed negative when the temperature difference therebetween is increasing.

TABLE I

| $\Delta T$ | $\Delta\Delta T$ | Signal Change |
|---|---|---|
| $\geq 2°$ C. | Pos. | add $\frac{1}{2}(\Delta\Delta T \times \Delta T)$, limit 10% |
|  | 0 | add $\Delta T/2$, limit 2% |
|  | Neg. | subt. $\Delta\Delta T$ if $\Delta T \leq 3°$ C. |
| $0 < \Delta T < 1°$ C. | Pos. | add $\Delta\Delta T$ |
|  | 0 | No change |
| $-1 < \Delta T < 0$ | Neg. | subt. $\Delta\Delta T$ |
|  | Pos. | add $\Delta\Delta T$ if $\Delta T \geq -3°$ C. |
| $\leq -2°$ C. | 0 | subt. $\Delta T/2$, limit 2% |

TABLE I-continued

| ΔT | ΔΔT | Signal Change |
|---|---|---|
| | Neg. | subt. ½(ΔT × ΔΔT) limit 10% duty cycle |

The procedure for implementing the control strategy of table I is as follows:

measure $T_{42}$ evaporator inlet temperature;
measure $T_{54}$ evaporator outlet temperature;
calculate $\Delta = T_{54} - T_{42}$;
calculate $\Delta\Delta = \Delta T_{new} - \Delta T_{old}$;
determined whether ΔT is positive, negative or zero;
if ΔT is positive—step A below;
if ΔT is zero—step B below;
if ΔT is negative—step C below;

A. where ΔT is positive, determine whether ΔΔT is positive, negative or zero;
  (i) if ΔΔT is positive, add $$\frac{\Delta T \times \Delta\Delta T}{2}$$

duty cycle;
  (ii) if ΔΔT is zero, add ½ΔT to duty cycle;
  (iii) if ΔΔT is negative, subtract ΔΔT from duty cycle when ΔT<3° C.;
B. where ΔT is zero, add ΔΔT to duty cycle.
C. where ΔT is negative, determine whether ΔΔT is positive, negative or zero;
  (i) if ΔΔT is positive, add ΔΔT to duty cycle when ΔT > −3° C.;
  (ii) if ΔΔT is zero, subtract ½ ΔT from duty cycle;
  (iii) if ΔΔT is negative, subtract ½(ΔT×ΔΔT) from duty cycle;

The control strategy set forth in Table I has been found satisfactory for an endothermic heat exchanger or evaporator operating with not more than 25 psi (1.75 Kg/cm²) fluid pressure drop thereacross, e.g. pressure differential between conduit 28 and conduit 32. It will be understood that the control signal changes indicated in Table I are applied as a percentage to the steady state signal and are intended as applicable to either a pulse width modulated or an amplitude modulated control signal.

In the presently preferred practice, the temperature signal from thermistor 42 may also be employed by the computer 48 to signal to the control signal generator for de-energizing the compressor clutch 15 when thermistor 42 senses refrigerant temperature below −6.7° C. as an indication of low refrigerant pressure.

When the sensed temperature $T_{42}$ is at −5.5° C. at time t=0, and at time t=5 minutes after compressor clutch "ON", $T_{42}$ is greater than −5.5° C., the computer 48 signals control signal generator 50 to cut off the compressor clutch 15 as an indication of low refrigerant charge. In the event $T_{42}$ is 5.5° C. at time t=0 and $T_{42}$ is greater than 5.5° C. at time t=1 minute after compressor clutch ON", the compressor clutch is cycled "OFF" as an indication that the system is out of refrigerant charge.

For normal operational cycling of the compressor clutch 15, when $T_{42}$, reaches 7.2° C. which is a chosen predetermined value, the clutch is turned "ON"; and, when $T_{42}$ falls to −5.5° C. which is a chosen predetermined value, the clutch is cycled "OFF".

It will further be understood that although the temperature thermistors 42, 54, 88 are shown and described as located in the control valve block, the thermistors 42, 54 may also be installed in the conduits 28, 32 adjacent respectively the inlet and outlet ports of the endothermic heat exchanger or evaporator 30. The thermistors 42, 54 are, in the present practice of the invention, preferably located in the valve block for convenience and ease of installation.

Figure 3:
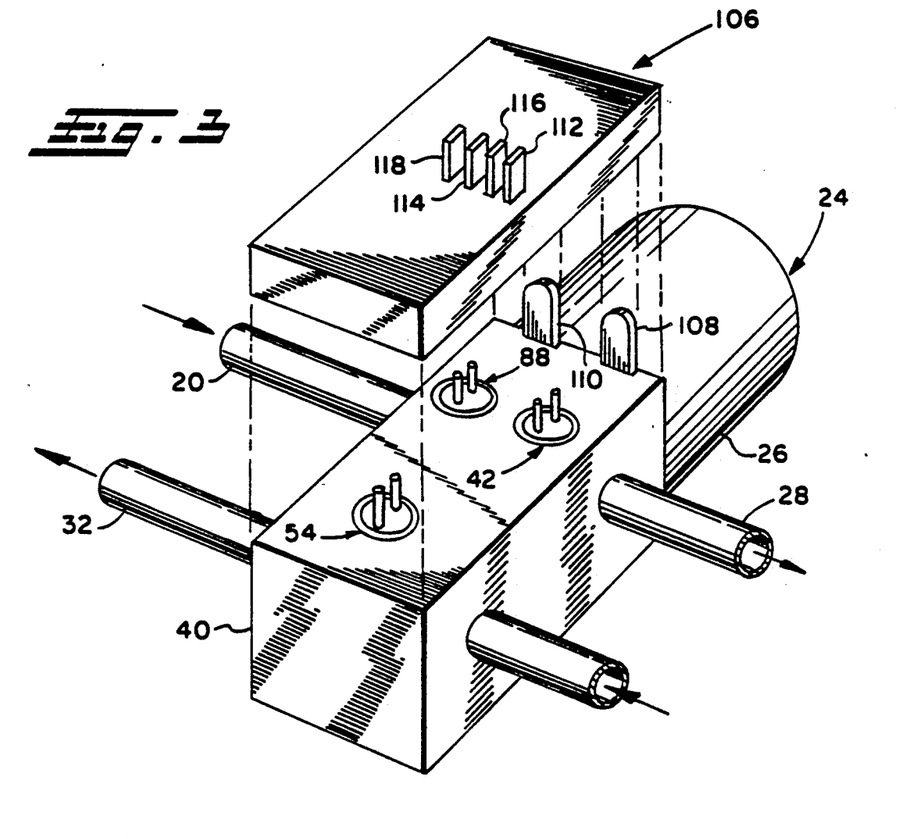
FIG. 3 is an enlarged portion of FIG. 1 and illustrates the valve assembly with the electronic module attached.

Referring now to FIGS. 1 and 3, the third temperature sensor in the form of a thermistor 88 is provided through the wall of the valve block 40 in the manner shown for the typical sensor installation in FIG. 2. The thermistor 88 has its sensing element extending into the flow path through the inlet conduit 20 on the high pressure inlet side of the valve for sensing the temperature of the refrigerant from the condensor, via dryer 22, as it enters the valve 24. The thermistor 88 is connected, schematically via leads 90, 92 in FIG. 1, to the microprocessor 48. The microprocessor 48 provides control logic for the control signal generator 50 which generates control signals schematically along leads 94, 96 to the electrically controlled compressor clutch 15 and to the condensor cooling fan, indicated generally at 98, which is driven by a motor 100, shown in FIG. 1 connected schematically to the control signal generator 50 by leads 102, 104. Upon the thermistor 88 sensing a predetermined temperature of the refrigerant flow in conduit 20, a signal is provided to the microprocessor for energizing the fan 98 to cool the condensor 18. The microprocessor 48, may also interpret the temperature signal from sensor 88 as an indication that excessive pressure is present in the fluid conduit 20 and function to generate a signal from control signal generator 50, along schematic lines 94, 96, to deactuate clutch 15 and cut out the compressor 12. In the present practice of the invention, when $T_{88}$ is greater than 90.5° C. which is a chosen predetermined value, the compressor clutch is de-energized on the basis that an overpressure condition exists. Then $T_{88}$ reaches 72° C., the computer 98 signals control generator 50 to energize condensor fan motor 100; and, when $T_{88}$ drops to 68° C., fan motor 100 is de-energized.

Referring to FIG. 3, the valve 24 is shown in the preferred practice with an electronic controller module, indicated generally at 106, disposed for direct plug-in connection to the terminals of the thermistors 42, 54, 88 and power terminals 108, 110 for the valve solenoid coil 26. The controller module 106 includes the power supply 52, the control signal generator 50 and the microprocessor 48. The module 106 is thus heat-sinked by direct contact with the valve block 40.

Connector terminals 112, 114, 116 and 118 extend eXternally from module 106 and are adapted for connection to the vehicle power source and appropriate temperature selection control inputs, as for example, from temperature select control 64 as shown in FIG. 1. Terminal connections are also provided for signal outputs to the solenoid 26 for the valve 24, the compressor clutch 15 and the fan motor 100. It will be understood that the two wire connections shown schematically in FIG. 1 would be replaced by single wire leads in a chassis ground 12 volt d.c. system such as that used on typical automotive applications.

Figure 5:
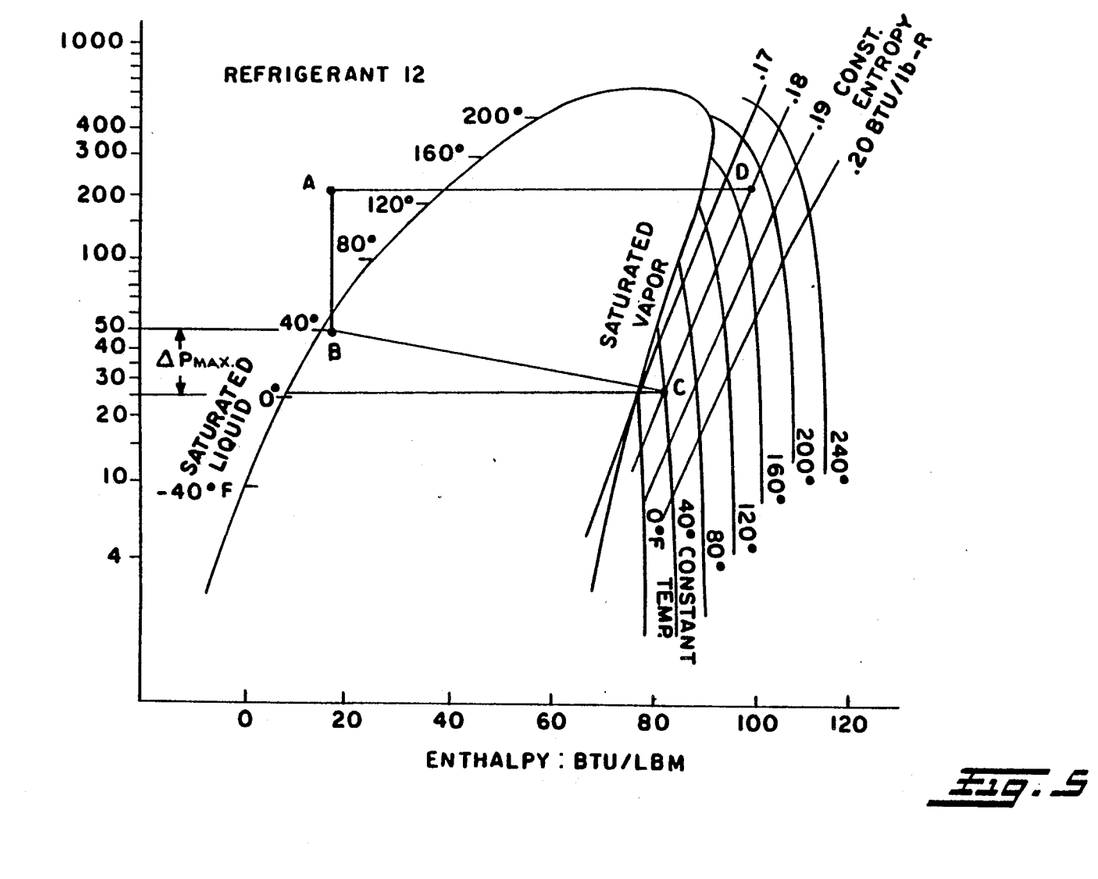

Referring to FIG. 5, an absolute pressure means enthalpy plot is illustrated for R-12 refrigerant with a family of isotherms cross-plotted and the familiar saturated vapor "dome" shown in solid line. A typical cycle for the refrigerant during operation of an automotive air conditioning system employing the present invention for control thereof, is illustrated by the solid line interconnecting the points A, B, C and D. It will be noted from the solid line plot in FIG. 5, that for a maximum pressure differential across the evaporator of 25 psi, denoted by Delta $P_{max}$, with saturated vapor at 40° F. at the evaporator inlet, the system functions to maintain the temperature difference between thermistor 42, denoted by the point B on the graph and thermistor 54, denoted by point C on the graph at a zero differential or constant temperature. If the point on the 40° F. isotherm for superheated vapor at the evaporator outlet is located corresponding to Delta $P_{max}$, it will be seen that the point falls to the right of the saturated vapor "dome" on the graph; and, thus for the range of pressure differentials experienced in evaporators of the type used for typical automotive air conditioning applications, only a minor amount of super heat is experienced by maintaining the temperature at the evaporator outlet (thermistor 54) at the same temperature as the evaporator inlet (thermistor 42).

The solid line interconnecting points C and D on the graph represents the essentially isentropic compression in the compressor; and, the solid line interconnecting points D and A represents the substantially constant pressure cooling in the condensor 30. The solid line interconnecting point A and point B represents the substantially isenthalpic expansion which occurs by flow of the refrigerant through the expansion valve 24.

The expansion valve outlet fluid pressure of 50 psi for point B and 200 psi for compressor output (line D-A) has been shown as typical for automotive passenger vehicle air conditioning systems. It will thus be seen from the plot in FIG. 5 that the strategy of maintaining the temperature of the refrigerant discharged from the evaporator at the same temperature as the refrigerant entering the evaporator is a valid control strategy and will maintain the refrigerant discharging from the evaporator in a vapor state at only a slightly superheated condition, thereby insuring maximum utilization of the evaporator.

Figure 4A:
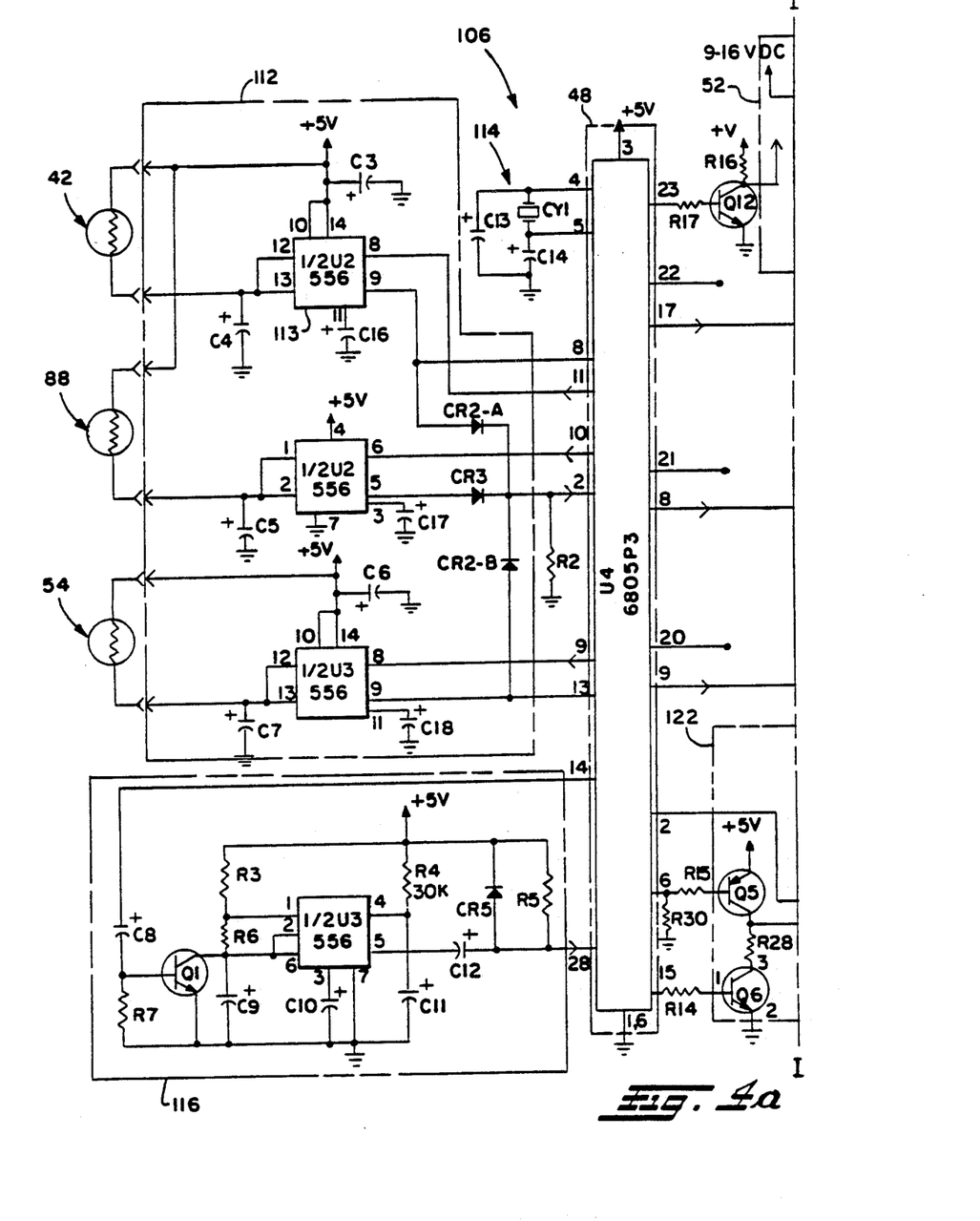
FIG. 4(a) and 4(b) is an electrical circuit schematic, joined along parting line I—I, of the control system of the present invention; and, FIG. 5 is a pressure-enthalpy chart for a typical refrigerant with a refrigerant cycle plotted thereon for a system controlled with the present invention.
Figure 4B:
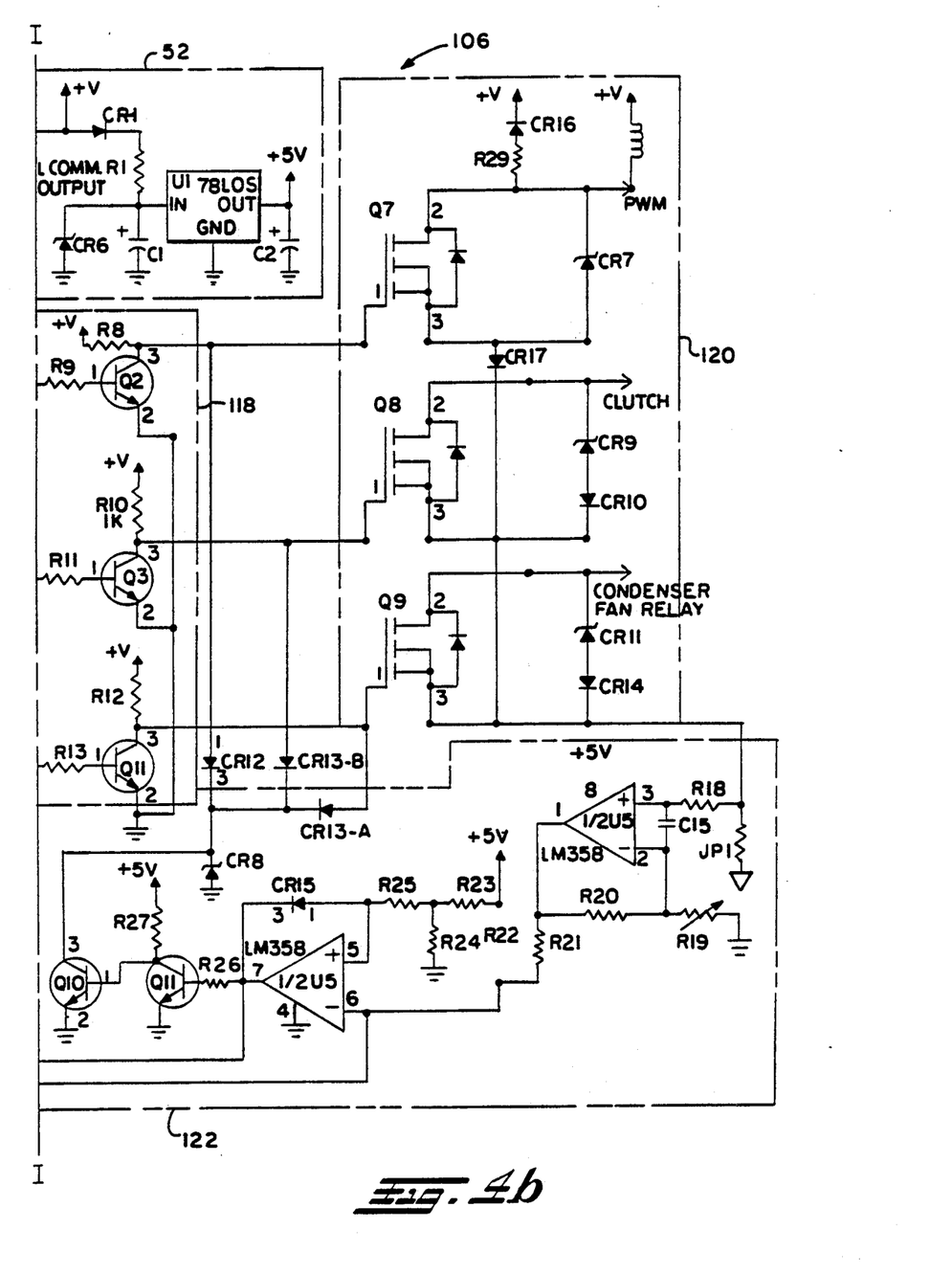

Referring to FIGS. 4A and 4B, the electrical schematic for the control module is illustrated and is divided along the party line I—I for ease of illustration. The values of resistors and capacitors and identification of solid state components are given in Table II and have been omitted from the drawings for clarity.

In FIG. 4A, the components bounded by the dashed outline 112 comprise a signal conditioning analog-to-digital converter for the input signals from the thermistors 42, 54 and 88. The temperature of each of the thermistors is read by the microprocessor by timing the charging time respectively of the capacitors C4, C5 and C7, which is varied by the changing resistance of thermistors. A crystal oscillator network is provided for timing the processor. The microprocessor is indicated by the dashed outline 48 and receives the temperature signal from thermistor 42 at pins 8 and 11 and is connected to the oscillator at pins 4 and 5 thereof. The signal from thermistor 88 is applied to the microprocessor 48 at pins 10 and 2; and, the signal from thermistor 54 is applied at pins 9 and 13. In the present practice, microprocessor 48 comprises a commercially available device bearing a type designation 6805P3.

In operation, the microprocessor typically pulses through pin 8, a timing device denoted 113, which preferably comprises a commercially available type 556 device, to commence charging of the capacity C4. When the capacitor is charged to ⅔Vcc or positive 5 Volts dc, the output of device 113 is applied to pin 11 of the microprocessor 48 for signalling the end of the time period. The microprocessor then compares the signals from thermistor 42 with the signal from thermistor 54 as recieved on pin 9. The microprocessor then outputs a signal to the predriver indicative of the comparison.

The components bounded by the dashed outline 118 in FIG. 4B comprises a predriver circuit employing power FET's Q7, Q8 and Q9, which, in conjunction with the output driver circuit denoted by dashed outline 120, comprise the control signal generator 50. The output of device Q7 in the output driver circuit 120 is connected to the solenoid 26; and, the output of FET driver Q8 is connected to the compressor clutch 15. The output of driver FET Q9 is connected to the fan motor 100.

The circuit components enclosed in dashed outline 116 in FIG. 4A comprise a timer circuit which times out and resets the microprocessor 48 unless the timer circuit is continually refreshed by the microprocessor from a pulse at pin 14 which occurs once each 70 millisecond during normal microprocessor operation, thereby permitting continued operation of the microprocessor only if operation is normal. In the event of a malfunction within the microprocessor, failure to provide a pulse at pin 14 will cause the circuit 122 to time out and cut off the outputs of the predriver circuit 122.

The circuit component within the dashed outline denoted by the reference numeral 52 in FIGS. 4A and 4B comprises a voltage regulating power supply circuit which provides a regulated positive five volts dc supply for the solid state components from the 12 volt dc onboard vehicle supply.

The circuit components bounded by dashed outline 122 in FIGS. 4A and 4B comprises an over-current sensing circuit which employs a 22 AWG jumper wire resistor JP1 in circuit with the driver pins of FEG's Q7, Q8 and Q9. The circuit 122 senses the voltage drop across JP1; and, signals the microprocessor when an over-current condition is sensed and shuts down the output drivers Q7, Q8 and Q9. A more detailed description of the circuit of FIGS. 4A and 4B is omitted for simplicity; as, those skill in the art will be able to readily recognize the technique employed as known.

TABLE II

| Resistor R | Ohms | Capacitor C | Value Farads | Device | Designation |
|---|---|---|---|---|---|
| 1 | 56 | 1 | 1.0 u, 35 v | Q-Q4, Q6 | 2N3904 |
| 2 | 10K | 2 | 0.1 u, 50 v | | |
| 3 | 100K | 3 | 0.1 u, 50 v | Q5 | 2N3906 |
| 4 | 30K | 4 | 0.1 u | | |
| 5 | 10K | 5 | 0.1 u | Q10-Q12 | 2N3904 |
| 6 | 1K | 6 | 0.1 u, 50 v | | |
| 7 | 1K | 7 | 0.1 u | Q7-9 | MTP3055A |
| 8 | 1K | 8 | 0.01 u | | |
| 9 | 2.2K | 9 | 0.1 u | CY1 | 4MHz |

TABLE II-continued

| Resistor R | Ohms | Capacitor C | Value Farads | Device | Designation |
|---|---|---|---|---|---|
| 10 | 1K | 10 | 0.01 u | | |
| 11 | 2.2K | 11 | 2.2 u | CR1 | GL41D |
| 12 | 1K | 12 | 2.2 u | | |
| 13 | 2.2K | 13 | 18 p | CR2A,2B,3,5 | 1N914 |
| 14 | 2.2K | 14 | 18 p | | |
| 15 | 2.2K | 15 | 0.01 u | CR6 | 1N4746,1W,18V |
| 16 | 1K | 16 | 0.01 u | | |
| 17 | 2.2K | | | CR7 | 1N5359,5W,24V |
| 18 | 4.7K | | | | |
| 19 | 10K | | | CR8 | IN4746 |
| 20 | 220K | | | | |
| 21 | 1K | | | CR9 | 1N5359 |
| 22 | 2.2K | | | | |
| 23 | 6.8K | | | CR11 | 1N4749 |
| 24 | 6.8K | | | | |
| 25 | 10K | | | CR13A,B,15 | 1N914 |
| 26 | 2.2K | | | | |
| 27 | 10K | | | CR16-19 | GL41D |
| 28 | 470 | | | | |
| 29 | 100 | | | | |
| 30 | 10K | | | | |

The present invention thus provides a unique and novel way of controlling refrigerant flow in a system for air conditioning in a compartment such as an automotive passenger compartment, and employs temperature sensors for sensing the temperature of the refrigerant entering and discharging from the endothermic heat exchanger or evaporator. The present invention provides electrical remote control of refrigerant flow and eliminates the need for sensing the pressure of the refrigerant in the flow lines. Although the invention has hereinabove been described with respect to the presently preferred practice, it will be understood that the invention is capable of modifications and variation and is limited only by the following claims.

We claim:

1. A controller assembly for controlling refrigerant flow in a vehicle air conditioning system comprising:
   (a) valve body means defining an inlet adapted to receive pressurized refrigerant, an outlet adapted for discharging said refrigerant at a lower pressure and a valving passage therebetween having therein a valve member movable between an open and closed position for controlling flow in said passage between said inlet and outlet;
   (b) motor means attached to said body means and operable upon periodic energization to move said valve member between said open and said closed position, said motor means having at least one electrical connector extending therefrom;
   (c) a first temperature sensing means attached to said body means and operative, upon electrical energization, for sensing the temperature in said outlet, said sensing means having at least one electrical connector extending therefrom;
   (d) said body means further defining an auxiliary passage therethrough, said auxiliary passage adapted for having refrigerant leaving an evaporator flow therethrough;
   (e) second temperature sensing means attached to said body means and operative, upon electrical energization for sensing the temperature in said auxiliary passage, said second sensing means having at least one electrical connector extending therefrom;
   (f) control circuit means comprising a module including a microcomputer and means operable to periodically energize said valve, said module attached to and in direct contact with said body means which has for heat conduction therewith, said module having receptacle means received therein, in plug-in arrangement, said motor electrical connector and said electrical connectors of said first and second temperature sensing means; and,
   (g) electrical supply connector means provided on said module and adapted for connection to an onboard source of electrical power.

2. The controller assembly defined in claim 1, wherein said control circuit means is connected to said motor, said electrical connector of said first and second temperature sensing in bayonet connection in a common direction.

3. The controller assembly defined in claim 1, further comprising a third temperature sensing means mounted on said body means and operable for sensing the temperature in said inlet, said third sensing means having at least one electrical connector extending therefrom and in bayonet connection with said control circuit means.

4. The controller assembly defined in claim 1, wherein said motor connectors and said electrical connectors of said first and second temperature sensing means all extend from said body means in a common direction.

* * * * *